(12) United States Patent
Kahkoska

(10) Patent No.: US 8,873,433 B2
(45) Date of Patent: Oct. 28, 2014

(54) METHOD OF DETERMINING IMMEDIATE TOPOLOGY OF A NETWORK CONNECTION

(75) Inventor: James A. Kahkoska, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 509 days.

(21) Appl. No.: 13/171,168

(22) Filed: Jun. 28, 2011

(65) Prior Publication Data

US 2013/0003558 A1 Jan. 3, 2013

(51) Int. Cl.
*H04L 12/28* (2006.01)
*H04L 12/26* (2006.01)
*H04L 12/12* (2006.01)
*H04L 12/24* (2006.01)

(52) U.S. Cl.
CPC ............ *H04L 43/50* (2013.01); *H04L 43/0811* (2013.01); *H04L 12/12* (2013.01); *H04L 41/12* (2013.01)
USPC ............ 370/256; 370/250; 370/254; 709/249

(58) Field of Classification Search
USPC ......................................................... 370/211
See application file for complete search history.

(56) References Cited

U.S. PATENT DOCUMENTS

2008/0316940 A1* 12/2008 Brooks et al. ................. 370/254

OTHER PUBLICATIONS

Fluke Networks, "Fluke Networks: One-Click Switched Network Vision", Apr. 1, 2001, technet.microsoft.com/en-us/library/cc722544.aspx.*

* cited by examiner

*Primary Examiner* — Jackie Zuniga Abad
(74) *Attorney, Agent, or Firm* — Edwards Wildman Palmer LLP; Scott D. Wofsy; Christopher J. Capelli

(57) ABSTRACT

A network test tool can determine if it is linked to directly to an indicated managed device or an intermediate unmanaged device. Discovery protocols and spanning tree are designed to map network topology and eliminate closed loops in networks. As such these management packets are among the first emerging from managed switches immediately upon acquiring a new link. By analyzing the first few packets, with timeouts, the tool can determine with a high degree of accuracy if it is really connected to the advertised nearest switch. If an unmanaged switch exists between the managed switch and tool, the managed switch will not detect the link event therefore not immediately send discovery packets. Once the tool determines it is not linked to the managed switch, further packet analysis can indicated if the intermediate device is a Layer 2 switch or Hub.

7 Claims, 2 Drawing Sheets

METHOD OF DETERMINING IMMEDIATE TOPOLOGY OF A NETWORK CONNECTION

BACKGROUND OF THE INVENTION

This invention relates to test and measurement in data communications and more particularly to network topology determination.

In network test and measurement operation, it can be helpful to determining an accurate network connection topology for a user of a portable network test tool.

Current test tools indicate network topology by reporting the first device that the tool is connected to, by monitoring for discovery protocol (Link Layer Discovery Protocol (LLDP), Cisco Discovery Protocol (CDP), or other discovery protocol), hereinafter xDP. This first device indication as implemented by these tools presents numerous problems:

1. Incorrect test indication: The tools incorrectly indicate the topology if there is an unmanaged switch or hub (hereinafter, switch) between the tool and the managed switch.

2. Unable to detect rogue switches: The tools do not detect the presence of unwanted or rogue switch devices. The availability and proliferation of low cost, unmanaged switches (e.g., $35 for 5 Port 10/100/1000 switch) makes them deployable by non-IT staff introducing unwanted port expansion, addition of network devices, and lower network reliability.

3. Decreased user confidence: In the cases when the tools are linked to a known unmanaged switch (e.g. in front of the tool) the tools do not indicate its presence, instead indicating an immediate connection to the nearest managed switch. This obvious miss-indication erodes user confidence in other test results that the tools may provide.

4. SNMP reliance: In many situations SNMP (Simple Network Management Protocol) is not available due to either SNMP running on a separate management plane or that the SNMP community strings are not shared.

SUMMARY OF THE INVENTION

In accordance with the invention, a network test tool determines whether it is linked directly to an indicated managed device or an intermediate unmanaged device. Analysis of initial packets, with timeouts, provide a determination of whether the tool is actually connected to an advertised nearest switch.

Accordingly, it is an object of the present disclosure to provide an improved network test tool for determining network topology.

It is a further object of the present disclosure to provide an improved network test device that will determine whether a managed switch is present, whether the tool is connected to a nearest switch, whether an unmanaged switch exists before the nearest switch, or whether a hub exists before the nearest switch.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present disclosure comprises a network test tool, adapted for determining network topology. This tool does not require SNMP.

Figure 1:
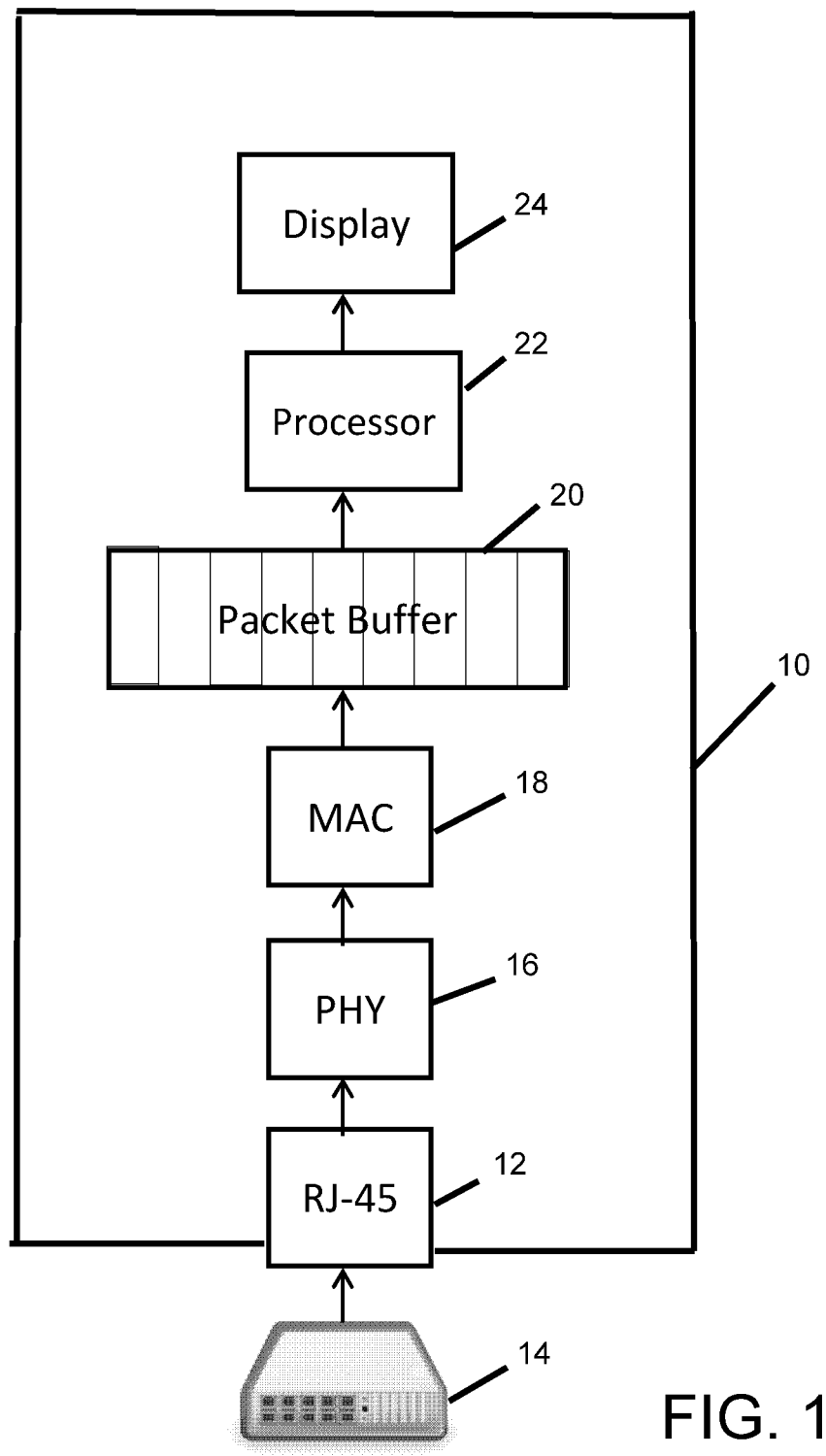
FIG. 1 is a block diagram of a tool for determining network topology.

Referring to FIG. 1, a block diagram of a tester for determining network topology, the tester 10 includes an interface 12 for connection to the network, which comprises an RJ-45 connector as employed in computer network environments. The RJ-45 connector allows connection of the tool to a network, represented by switch 14 in FIG. 1. The connector interfaces the external signals to physical layer block 16, which operates to connect the media access controller (MAC) 18 to the physical medium of the network.

MAC 18 interfaces with a packet buffer 20, for storing packets received, for processing by processor 22. Processor 22 interfaces with a display 24 for providing test results and otherwise interfacing with a user. The display may include touch screen functionality for operational control of the tool, and/or user operable keys or other i/o devices may be provided for the user to employ in operating the tool.

Figure 2:
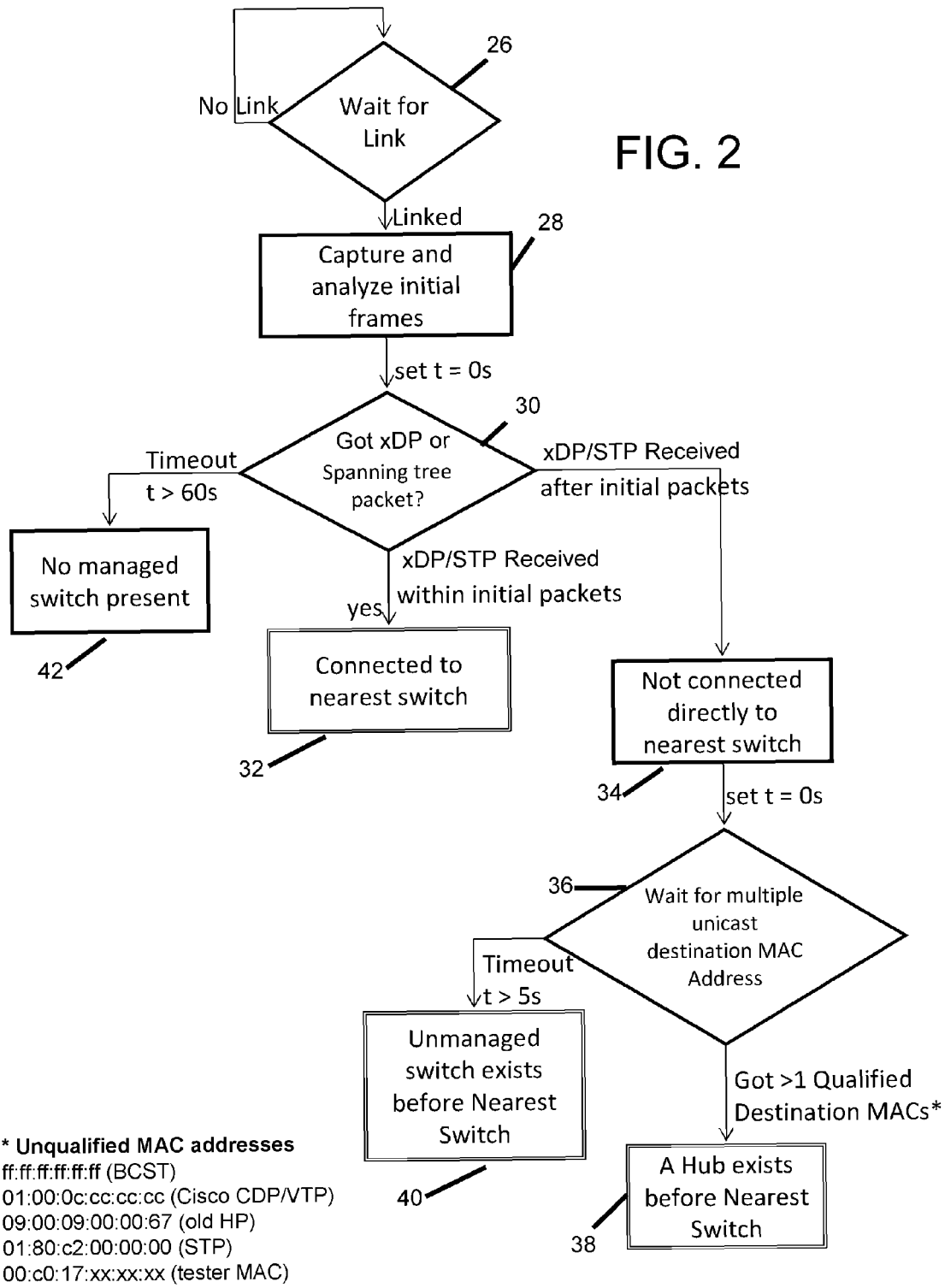
FIG. 2 is a flow chart of operational steps for determining network topology.

Referring now to FIG. 2, flow chart of operational steps for determining network topology in accordance with the tool disclose herein, the processor 22 is operating the tool by initially waiting for link pulse on the connection, sent by a device when it is not sending or receiving data (block 26). On detection of link pulse, at block 28, initial frames are captured and analyzed, and a timer t is initialized to zero. Decision block 30 determines whether the initial frames are xDP (discovery protocol) or spanning tree packets (STP). If the initial frames are xDP (discovery protocol) or spanning tree packets, it is determined that the tool is connected to the nearest managed switch, and this information may be reported to the user, by an appropriate report of information related to this on display 24 (block 32).

Returning to decision block 30, if discovery protocol or spanning tree packets were received, but they were received after the initial packets, then at block 34 it is noted that the tool is not connected directly to the nearest managed switch. A timer t is started, initialized to zero, and at block 36, the process waits for multiple unicast destination MAC addresses or timeout. If more than 1 qualified destination MAC addresses are seen before timeout, it is determined at block 38 that a hub exists before the nearest managed switch, as the hub is transmitting all data that it sees. This determination may be reported to the user via display 24, for example.

If at block 36, timeout occurs before more than 1 qualified destination MAC addresses are seen, the timeout value being 5 seconds in the illustrated embodiment, then it is determined that an unmanaged switch exists between the test tool and the nearest managed switch, block 40, and this determination may be reported to the user, again via display 24, for example Returning to block 30, if a timeout occurs with no discovery protocol or spanning tree packets having been received, it is determined that no managed switch is present, block 42, which may be reported by display 24, for example. In a particular embodiment, the timeout value is set to be 60 seconds.

Accordingly the network test tool 10, upon being connected to a network, determines whether it is directly connected to a managed switch, whether there is an intermediate unmanaged switch or hub, or whether no managed switch is present. The first few packets and timing are analyzed to provide a highly accurate indication of whether the tool is actually connected to the advertised nearest switch. This provides useful information for IT personnel in order to manage network operation.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A hand held test instrument for determining immediate network topology, comprising:
   an interface for connection with a network under test; and
   a tester configured to
   determine whether discovery protocol or spanning tree packets are received within initial packets;
   report a direct connection to a nearest managed switch based on determining that the discovery protocol or spanning tree packets were received within the initial packets;
   report that a hub is connected between the hand held test instrument and the nearest managed switch based on determining that multiple unicast destination Media Access Control (MAC) addresses are received during a first predefined time period; and
   report that an unmanaged switch is connected between the hand held test instrument and the nearest managed switch based on determining that a timeout corresponding to the first predefined time period occurs prior to receiving multiple unicast destination Media Access Control (MAC) addresses.

2. The hand held test instrument for determining immediate network topology according to claim 1, wherein said tester is further configured to determine whether no managed switch is present.

3. The hand held test instrument for determining immediate network topology according to claim 1, wherein the first predefined time period is approximately equal to 5 seconds.

4. A method of determining immediate network topology, comprising:
   determining, by a hand held tester instrument, whether discovery protocol or spanning tree packets are received within initial packets;
   reporting a direct connection to a nearest managed switch based on determining that the discovery protocol or spanning tree packets were received within the initial packets;
   reporting that a hub is connected between the hand held tester instrument and the nearest managed switch based on determining that multiple unicast destination Media Access Control (MAC) addresses are received during a first predefined time period; and
   reporting that an unmanaged switch is connected between the hand held tester instrument and the nearest managed switch based on determining that a timeout corresponding to the first predefined time period occurs prior to receiving multiple unicast destination Media Access Control (MAC) addresses.

5. The method according to claim 4, further comprising:
   reporting that no direct connection exists between the hand held tester instrument and a nearest managed switch based on determining that the discovery protocol or spanning tree packets were not received within the initial packets but were received after the initial packets.

6. The method according to claim 4, further comprising,
   reporting that no managed switch is present based on determining that no discovery protocol or spanning tree packets were received within a second predefined time period.

7. The method according to claim 6, wherein the first predefined time period is approximately equal to 5 seconds and wherein the second predefined time period is approximately equal to 60 seconds.

* * * * *